United States Patent
Takakura

Patent Number: 6,029,791
Date of Patent: Feb. 29, 2000

[54] WET-TYPE FRICTION PLATE HAVING SMALL HOLES ON THE SURFACE

[75] Inventor: Norio Takakura, Hokkaido, Japan

[73] Assignee: Dynac Corporation, Hokkaido, Japan

[21] Appl. No.: 09/086,678

[22] Filed: May 28, 1998

[30] Foreign Application Priority Data

May 29, 1997 [JP] Japan .................................. 9-154293

[51] Int. Cl.[7] .................................................. F16D 11/00
[52] U.S. Cl. ...................................................... 192/107 M
[58] Field of Search ...................... 192/107 M; 523/149

[56] References Cited

U.S. PATENT DOCUMENTS

| | | | |
|---|---|---|---|
| 3,738,901 | 6/1973 | Matsushima et al. | 192/107 M |
| 4,951,798 | 8/1990 | Knoess | 192/107 M |
| 5,004,089 | 4/1991 | Hara et al. | 192/107 M |
| 5,093,057 | 3/1992 | Hara et al. | 264/112 |

Primary Examiner—Charles A. Marmor
Assistant Examiner—Tisha D. Waddell
Attorney, Agent, or Firm—Duane, Morris & Heckscher, LLP

[57] ABSTRACT

An advantage of the present invention is the provision of a friction material having a porous structure and a large static coefficient of friction, that is made to have a porous structure so as to improve heat resistance but which does not exhibit time-varying characteristics in friction at the beginning of engagement.

A friction material 120 is provided on the surface thereof with small holes 160 each of which is 0.02 mm$^2$ to 0.2 mm$^2$ in size and whose area ratio to the whole surface area of the friction material 120 is not less than 5% and whose ratio of depth to the thickness of the friction material 120 is not less than 20% and holds oil in the small holes 160.

Even if the friction material 120 is made to have a porous structure, an oil film is always formed on a friction sliding surface by the oil held in the small holes 160 to reduce a shearing force produced when an associated plate shears the oil film, thereby preventing an increase in the dynamic coefficient of friction, which can prevent a speed change shock.

1 Claim, 8 Drawing Sheets

TEST CONDITIONS
NUMBER OF REVOLUTIONS: 3600 rpm, INERTIA: 0.0350kg-m-s², TEMPERATURE: 40°c, SAMPLE SIZE: ⌀ 126.25 × ⌀ 106.35, THICKNESS OF FRICTION MATERIAL: 0.27t

WET-TYPE FRICTION PLATE HAVING SMALL HOLES ON THE SURFACE

FIELD OF THE INVENTION

The present invention generally relates to wet-type friction engagement devices, and more particularly to wet-type friction engagement clutch mechanisms, wet-type friction brake mechanisms, or the like, used for an automatic transmission for a car or a transmission for an industrial machine or a construction machine.

BACKGROUND OF THE INVENTION

Figure 1:
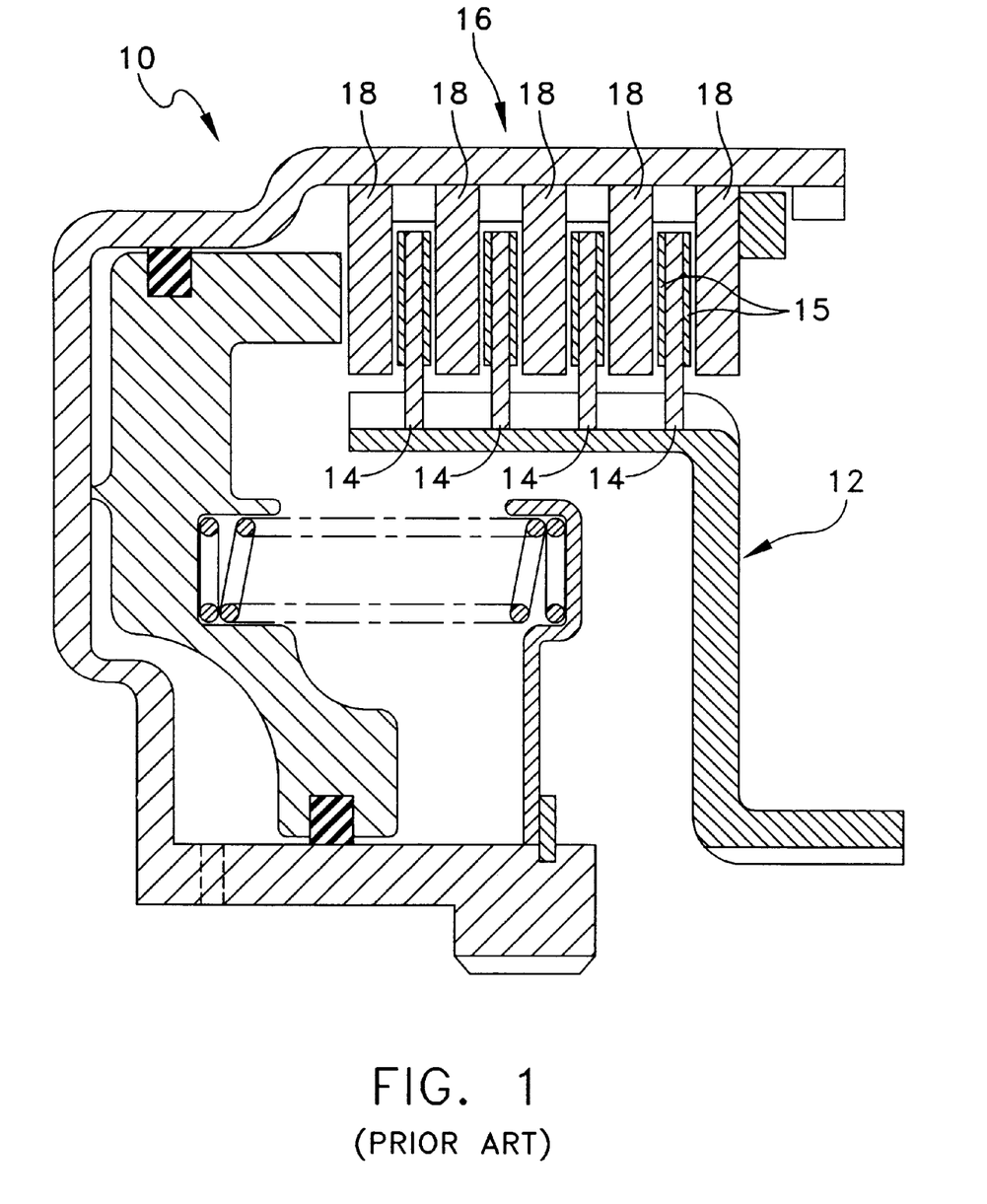
FIG. 1 is a sectional view of a wet-type friction engagement device in accordance with a prior art which has friction materials on both surfaces of internal tooth plates.

FIG. 1 illustrates a typical prior art wet-type friction engagement device 10 having friction material on both sides. Friction engagement device 10 comprises internal tooth discs 14 which are spline-fitted in a hub 12 and external tooth discs 18 which are spline-fitted in a drum 16 and are alternated with the internal tooth discs 14.

Each of the internal tooth discs 14 is fixedly provided with friction material 15 on both surfaces thereof and, when a hydraulically operated piston 11 is moved in an axial direction, relative to discs 14 and 18, the internal tooth discs 14 are engaged with the external tooth discs 18 to transmit torque. In prior art wet-type friction engagement device 10, cooling oil is supplied to the friction sliding surfaces.

Typically, friction material 15 is fixed to internal tooth disc 14 so that friction engagement device 10 comprises high torque transmission capacity and is durable enough to withstand the high temperature produced by sliding friction during actuation.

Prior art friction material 15 typically has a large static coefficient of friction and a high torque transmission capacity. However, friction material having a large static coefficient of friction is inferior in heat resistance. Thus, in prior art friction engagement devices 10, friction materials having a large static coefficient of friction, are formed such that they have a porous texture or structure having an intricate network of pores that are open on its surface and adapted to hold oil and thereby cool the friction material during engagement to improve heat resistance.

Figure 2:
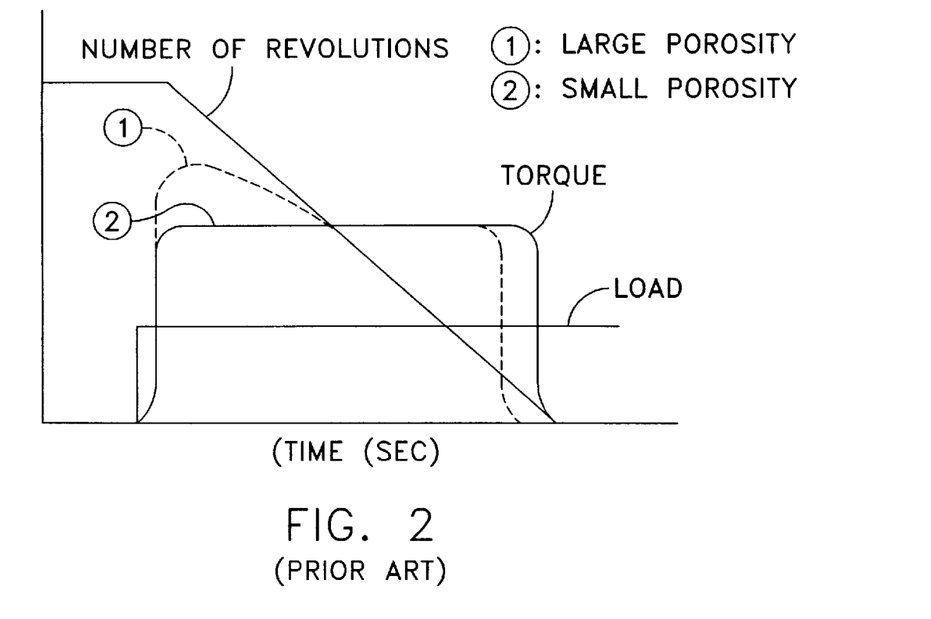
FIG. 2 shows time-varying changes in transmission torque and the like of friction materials having different porosity.
Figure 3:
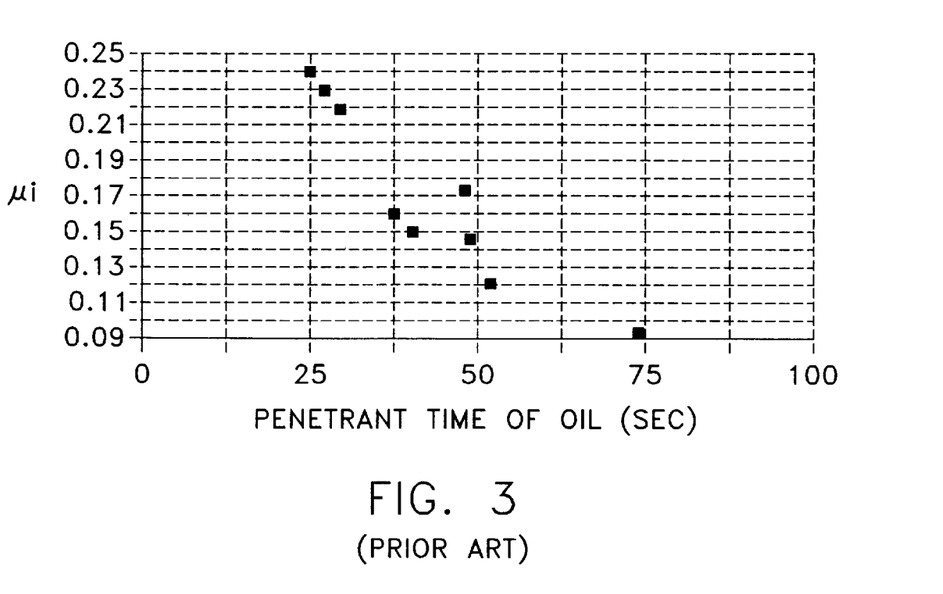
FIG. 3 shows a relationship between the oil penetrant time and a dynamic coefficient of friction trials having different porosity.

Based on the prior art alone, it would appear that highly porous friction material can hold more oil and therefore can improve cooling effectiveness and hence can improve heat resistance. However, as shown in FIG. 2, if the degree of porosity of the friction material is increased so as to improve heat resistance, transmission torque output by a friction engagement device 10, at the beginning of engagement, is increased, and its torque characteristic varies with time as compared with a friction material having a low degree of porosity. FIG. 3 shows the relationship between oil penetrant time (X axis) during which oil on a sliding surface penetrates into a friction material, and the dynamic coefficient of friction $\mu i$ (Y axis) at the beginning of engagement for a plurality of friction materials having different degrees of porosity (and hence being different in penetrant time).

As is evident from FIGS. 2 and 3, if the friction material has a high degree of porosity, the thickness of the film of oil disposed between the friction material and a plate associated therewith is difficult to maintain on the sliding surface, and quickly penetrates into the friction material thereby reducing the thickness of the oil film on the sliding surface. As a result, the dynamic coefficient of friction $\mu i$ increases at the beginning of engagement. In other words, if friction material having a high degree of porosity is used so as to improve heat resistance in a typical wet-type friction engagement device 10, its dynamic coefficient of friction increases. Additionally, friction material having a high degree of porosity exhibits the problem of time-varying torque transmission at the beginning of engagement. These time variations in transmission of the torque are manifested as a speed change shock in the system.

SUMMARY OF THE INVENTION

The present invention solves the above-described problems by providing a wet-type friction plate comprising a core plate and a friction material which is fixed to the core plate and has formed in the surface thereof small holes each of which is sized in the range from about 0.02 mm$^2$ to about 0.2 mm$^2$ and are at least 20% of the thickness of the friction material in depth and wherein the ratio of the area defined by said holes to the whole surface area of the friction material is not less than 5%.

BRIEF DESCRIPTION OF THE DRAWINGS

These and other objects, features and advantages of the present invention will be more fully disclosed in, or rendered obvious by, the following detailed description of the preferred embodiment of th invention, which is to be considered together with the accompanying drawings wherein like numbers refer to like parts and further wherein.

DESCRIPTION OF THE PREFERRED EMBODIMENT

According to the present invention, an effect can be produced by making the small holes in the surface of the friction material that, even if the friction material having a large static coefficient of friction and a high torque transmission capacity is made more porous so as to improve heat resistance, the friction material has oil in the small holes on the surface thereof and always forms an oil film between the friction material and the associated plate to prevent the dynamic coefficient of friction from being increased by a shearing force.

Moreover, the present invention produces an effect that an increase in the dynamic coefficient of friction is prevented at the beginning of engagement and hence a speed change shock is prevented.

Figure 4:
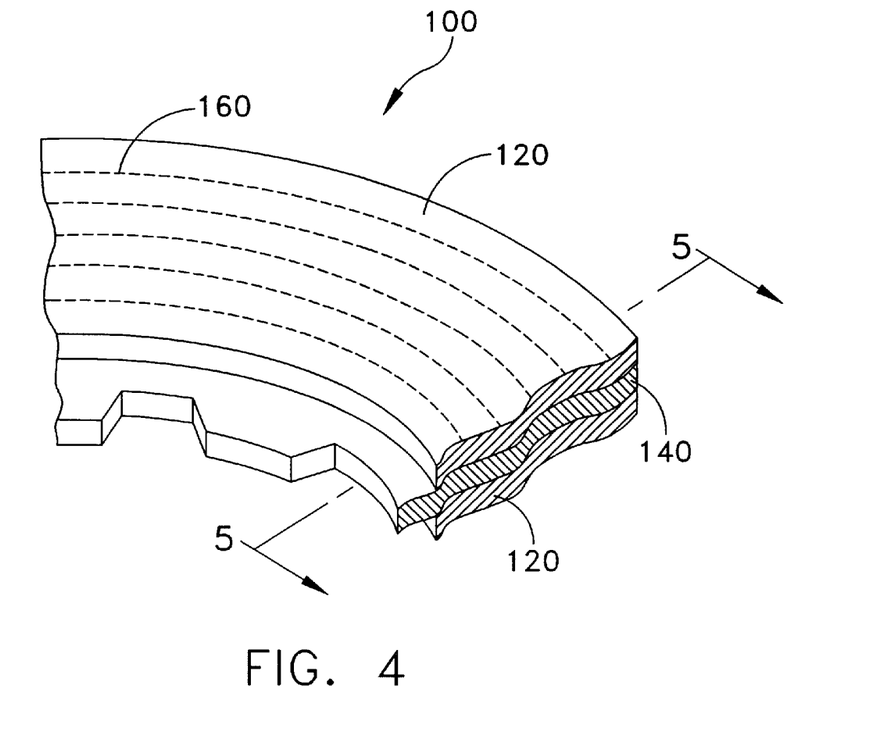
FIG. 4 is a perspective view of a part of a wet-type friction plate in accordance with the present invention.
Figure 5:
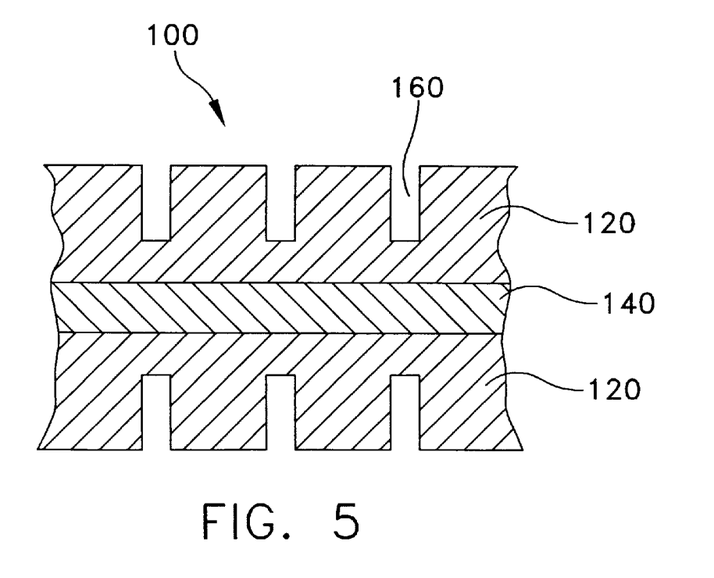
FIG. 5 is an enlarged sectional view taken on a line 5—5 in FIG. 4.
Figure 6:
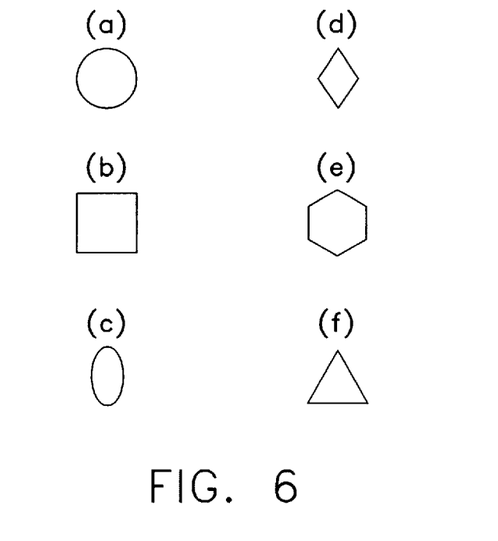
FIG. 6(a)–6(f) each a plan view of a small hole formed in the surface of a wet-type material formed in accordance with the present invention.

FIG. 4 shows a friction plate 100 in accordance with the present invention which is fixedly provided with friction materials 120 having small holes 160 defined through its surface. The friction plate 100 corresponds to an internal tooth disc which is spline-fitted in a hub (not shown) and whose core plate 140 is fixedly provided on both surfaces thereof with the friction materials 120 having small holes 160 defined in its surface.

The small holes 160 on the surface of the friction material 120 are formed such that each of them has a size of 0.02 mm$^2$ to 0.2 mm$^2$ and a depth of not less than 20% of the thickness of the friction material 120. Advantageously, the area ratio of the small holes is not less than 5% of the whole area of the friction material 120. Although, FIGS. 6(a) to 6(f) show the preferred embodiments of the small holes formed on the friction material in accordance with the present invention, it is not intended to limit the shapes of the small holes to these shapes, and in short, it is essential only that the area ratio of the small holes to the whole surface area of the friction material, the ratio of depth of the small holes to the thickness of the friction material, and the like, satisfy the above-described conditions.

Moreover, although the small holes 160 defined in friction material 120 are made in the circumferential direction of the friction material 120, when friction material 120 is shaped like a disc, it is not required to arrange the small holes in this manner, and it is essential only that the small holes are made to satisfy the above-described conditions.

Further, although the friction plate 100 (which is fixed to an internal tooth disc used for a wet-type friction engagement device and which has friction materials on both surfaces thereof) has been described, it is not intended to limit the present invention to such a friction plate which has friction materials on both surfaces thereof and it is needless to say that the present invention can be applied also to devices of the type which have a friction material on one surface if the friction material is used for a wet-type friction engagement device. Although these small holes are typically made by a laser, the hole making method is not limited to a laser.

Figure 7:
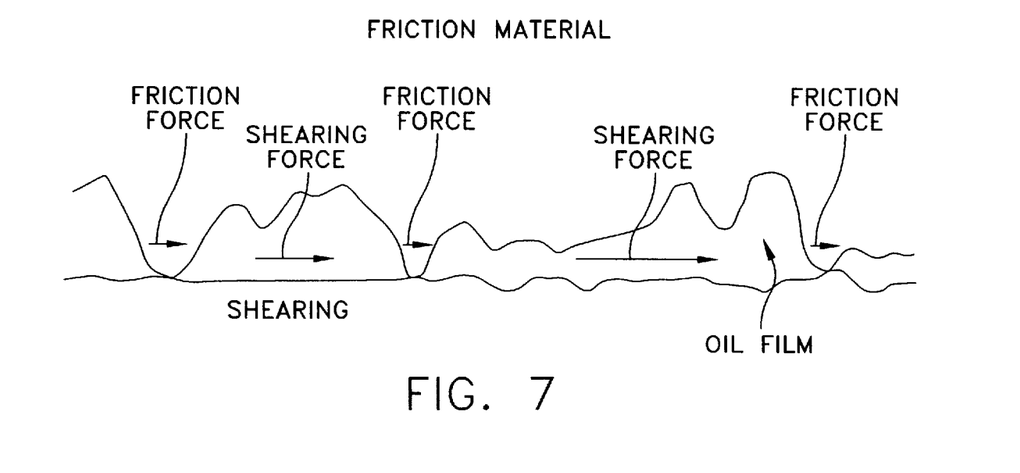
FIG. 7 illustrates how a friction force and a shearing force are generated between the surface of a friction material and an associated plate at the beginning of engagement.

FIG. 7 is a sectional view illustrating a state of a sliding surface between a friction material and an associated plate at the beginning of engagement. In general, a dynamic coefficient of friction at the beginning of engagement is greatly affected by an oil film existing on a sliding surface between the friction material and the associated plate. This is because, at the beginning of engagement, a shearing force generated when the oil film existing between the friction material and the associated plate is sheared by the associated plate, the shearing is larger than a friction force generated when the friction material slides on the associated plate and affects transmission torque. In other words, if the oil film existing between the friction material and the associated plate is thick, the shearing force for shearing the oil film is small and hence the dynamic coefficient of friction is decreased whereas, if the oil film existing between the friction material and the associated plate is thin, the shearing force is large and hence the dynamic coefficient of friction is increased.

Therefore, to prevent a speed change shock during driving, it is recommended that the oil film existing between the friction material and the associated plate be maintained at a constant thickness as much as possible.

Figure 8:
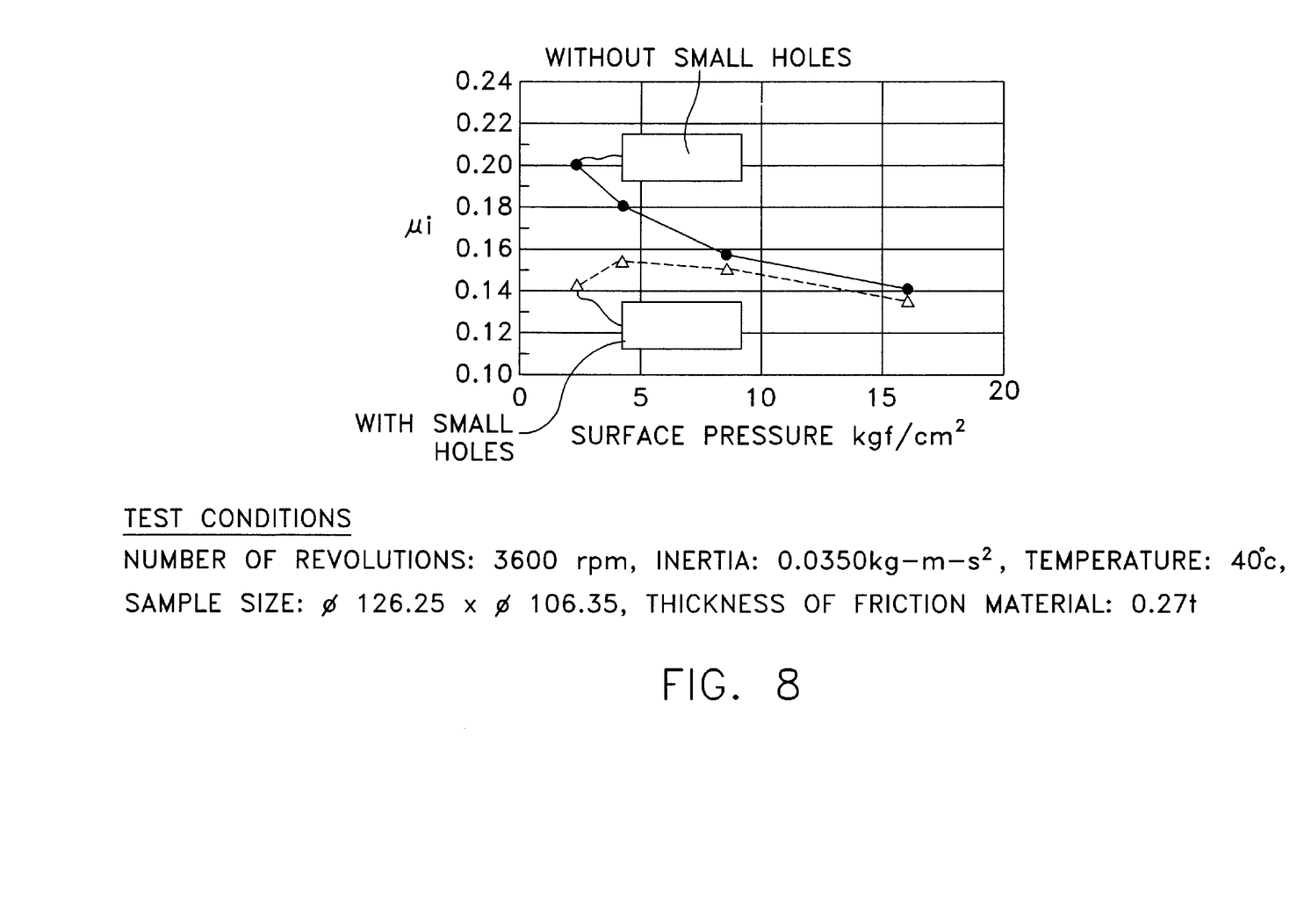
FIG. 8 shows a relationship between a surface pressure and a dynamic coefficient of friction.

FIG. 8 shows a relationship between a surface pressure and a dynamic coefficient of friction $\mu i$ of a sliding surface. As is evident from FIG. 8, the dynamic coefficient of friction of a friction material having small holes on the surface of the friction material is not varied greatly in comparison with a friction material having no small holes even if an engagement is advanced and hence the surface pressure is increased, which means a slight variation in friction characteristic.

This means that the friction material having small holes on the surface thereof holds oil in the small holes and that an oil film tends to be formed always between the friction material and the associated plate even if the engagement is advanced.

Figure 9:
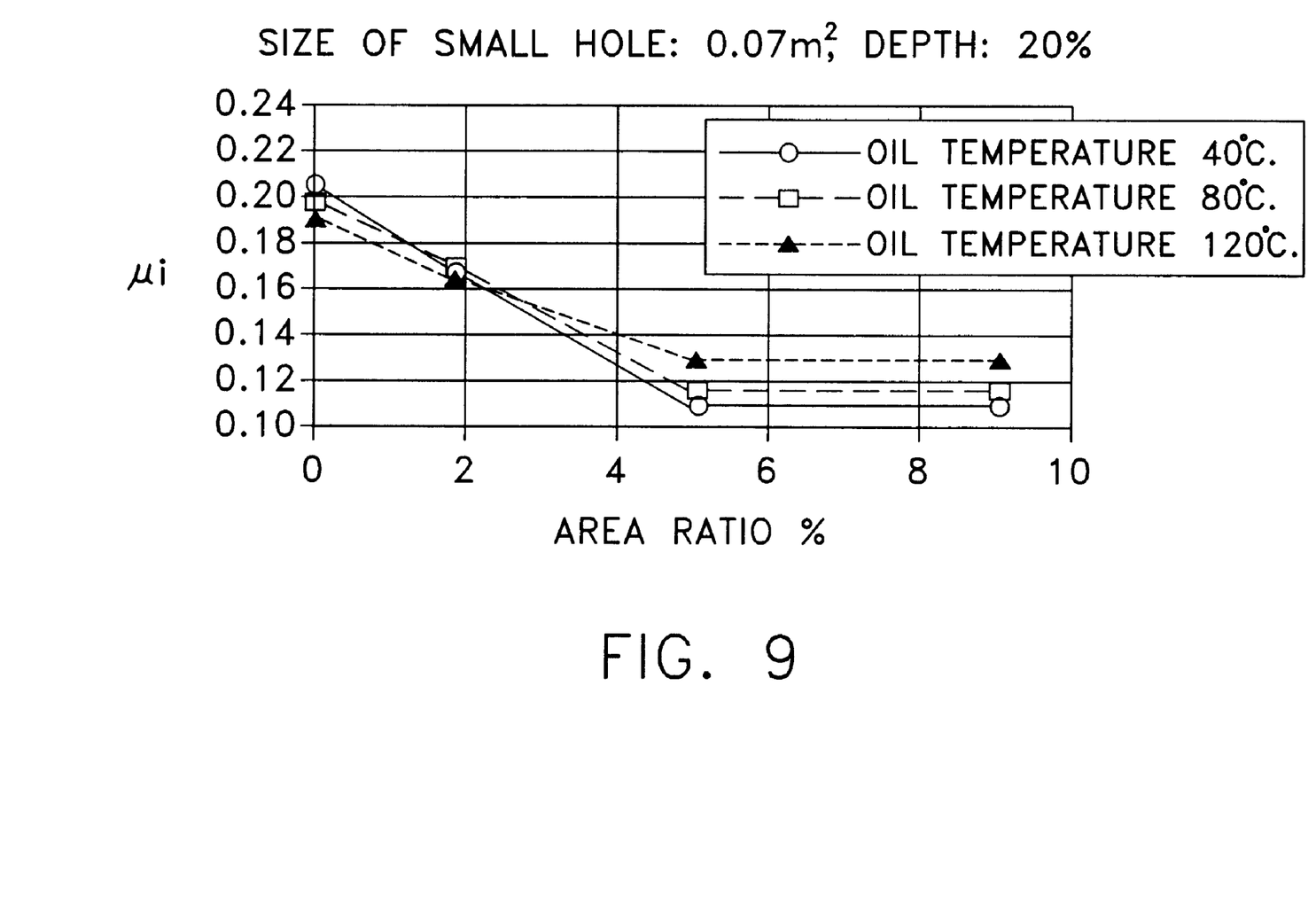
FIG. 9 shows a relationship between an area ratio of small holes to the whole surface area of the friction material and a dynamic coefficient of friction.

Next, FIG. 9 shows a relationship between an area ratio of small holes formed on the surface of the friction material to the whole surface area of a friction material and a dynamic coefficient of friction $\mu i$. As is evident from FIG. 8, the dynamic coefficient of friction $\mu i$ is abruptly decreased near a point where the area ratio of the small holes is 5% of the whole area of the friction material and is nearly constant if the area ratio is not less than 5%.

Therefore, if the small holes are formed such that the area ratio of the small holes to the whole surface area of the friction material is not less than 5%, the dynamic coefficient of friction $\mu i$ can be effectively decreased.

Figure 10:
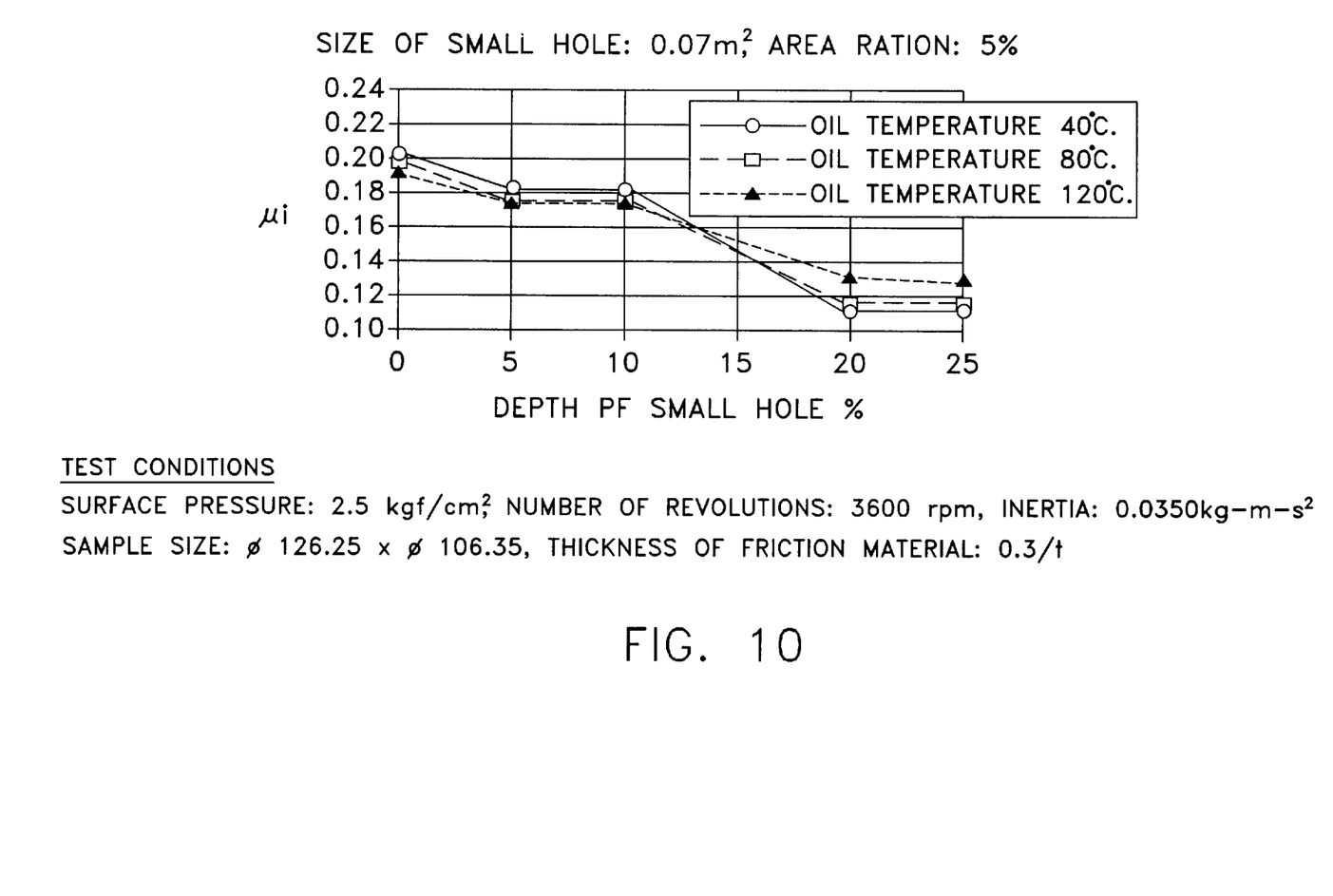
FIG. 10 shows a relationship between the ratio of depth of a small hole to the thickness of a fraction material and a dynamic coefficient of friction.

Next, FIG. 10 shows a relationship between a ratio of the depth of the small holes formed on the surface of the friction material to the thickness of the friction material and a dynamic coefficient of friction $\mu i$ and shows that, if the ratio of the depth of the small holes to the thickness of the friction material is not less than 20%, the dynamic coefficient of friction $\mu i$ is remarkably decreased.

Figure 11:
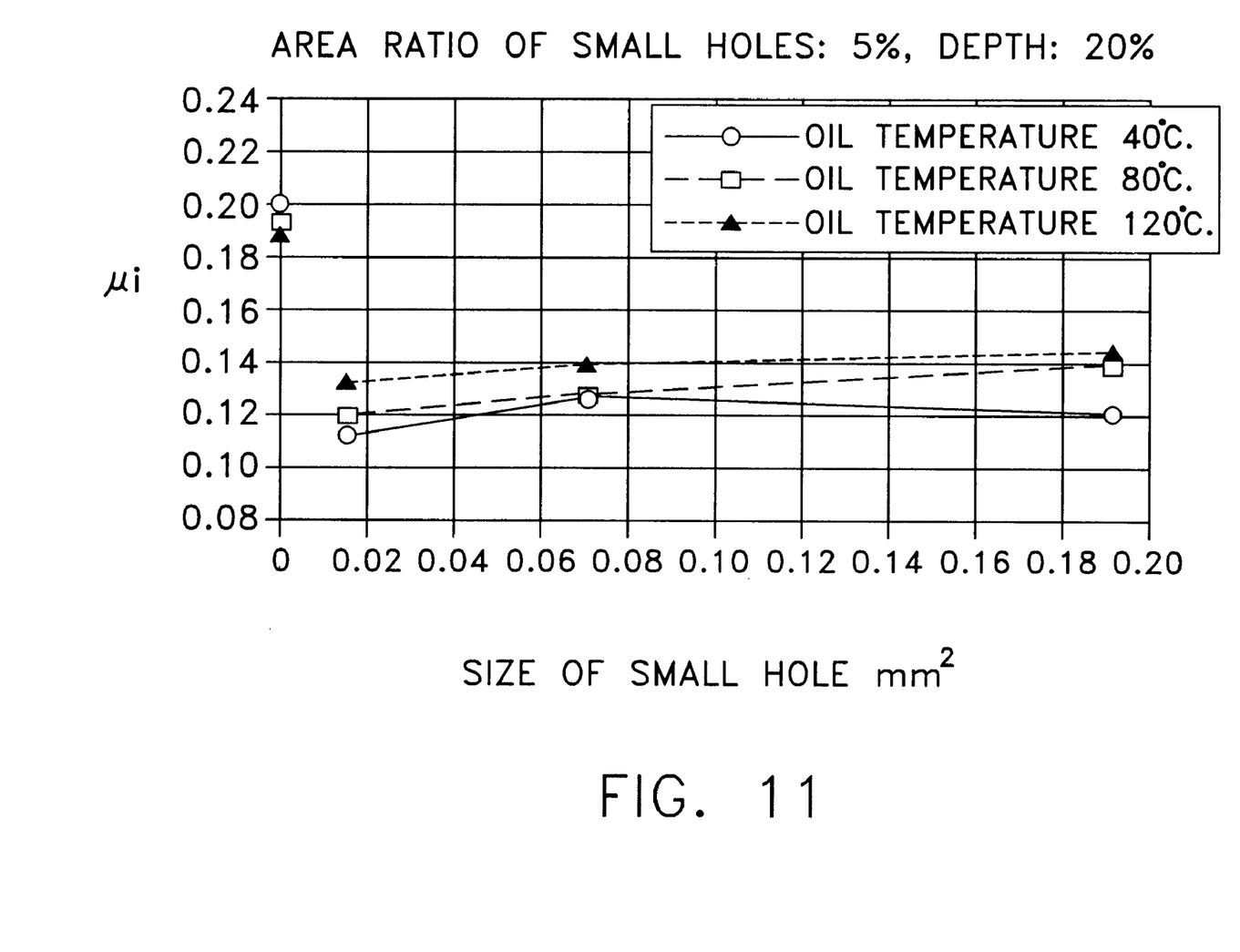
FIG. 11 shows a relationship between a size of a small hole and a dynamic coefficient of friction.

Further, FIG. 11 shows a relationship between a change in a size of a small hole formed on the surface of the friction material and a dynamic coefficient of friction $\mu i$, wherein the small holes are formed such that the area ratio of the small holes to the whole surface area of the friction material is 5% and the ratio of depth of the friction material to the thickness of the friction material is 20%. As is evident from FIG. 8, if the size of the small hole ranges from 0.02 mm$^2$ to 0.2 mm$^2$ under a condition in which the area ratio of the small holes and the ratio of depth are constant, the dynamic coefficient of friction $\mu i$ is hardly varied.

As is evident from FIGS. 9 to 11, if the small holes whose area ratio to the whole surface area of the friction material is at least 5% and whose ratio of depth to the thickness of the friction material is at least 20% (the maximum ratio is 100%) and whose size ranges from 0.02 mm$^2$ to 0.2 mm$^2$ are formed on the surface of the friction material, the dynamic coefficient of friction $\mu i$ can be effectively decreased.

Moreover, the area ratio and the ratio of depth are effective if they are in the above-described described ranges, but in reality, if the friction material is provided with the small holes whose area ratio to the whole surface area of the friction material is from not less than 5% to 20% at the maximum and whose ratio of depth to the thickness of the friction material is not less than 20%, the effect according to the present invention can be produced.

As described above, since according to the present invention the friction material having a large static coefficient of friction is made to have a porous structure and to have the small holes on the surface thereof to hold oil in the small holes and hence always forms an oil film on the sliding surface between the friction material and the associated plate, the thin oil film existing between the friction material and the associated plate is sheared by the associated plate to reduce a shearing force produced, thereby preventing an increase in transmission torque at the beginning of engagement, which prevents the speed change shock.

What is claimed is:

1. A wet-type friction plate comprising a core plate and a friction material which is fixed to the core plate and has on the surface thereof small holes each of which is 0.02 mm$^2$ to 0.2 mm$^2$ in area and is not less than 20% of the thickness of the friction material in depth and whose area ratio to the whole surface area of the friction material is not less than 5%.

* * * * *